United States Patent [19]

Schoenafinger et al.

[11] 4,275,114

[45] Jun. 23, 1981

[54] MAGNETIC RECORDING MEDIUM AND METHOD OF STABILIZATION OF CHROMIUM DIOXIDE MAGNETIC PIGMENTS

[75] Inventors: Eduard Schoenafinger, Jenesien, Italy; Herbert Motz, Ludwigshafen, Fed. Rep. of Germany; Manfred Ohlinger, Frankenthal, Fed. Rep. of Germany; Paul Deigner, Weisenheim, Fed. Rep. of Germany; Werner Grau, Willstaett, Fed. Rep. of Germany

[73] Assignee: BASF Aktiengesellschaft, Fed. Rep. of Germany

[21] Appl. No.: 776,224

[22] Filed: Mar. 10, 1977

[30] Foreign Application Priority Data

Apr. 23, 1976 [DE] Fed. Rep. of Germany ....... 2617809

[51] Int. Cl.$^3$ .............................................. B32B 5/16
[52] U.S. Cl. .................................. 428/328; 427/127; 427/128; 427/387; 428/331; 428/447; 428/900; 428/695
[58] Field of Search .................................. 427/127–132, 427/48, 387; 252/62.54; 428/447, 328, 451, 331, 900, 539

[56] References Cited

U.S. PATENT DOCUMENTS 4,005,242   1/1977   Kopke et al. ........................ 427/127

*Primary Examiner*—Bernard D. Pianalto
*Attorney, Agent, or Firm*—Keil & Witherspoon

[57] ABSTRACT

Chromium dioxide magnetic pigments are stabilized against loss of their magnetic properties by treating them, in aqueous and/or alcoholic suspension, with a block copolymer consisting of siloxane units and alkyleneoxy units of 2 to 4 carbon atoms, the alkyleneoxy units being bonded to the polysiloxane radical by a Si—O—C or Si—C group, in an amount of from 1 to 40% by weight based on the chromium dioxide, after which the latter is separated off and dried at from 50° to 200° C. The stabilized chromium dioxide magnetic pigments may be used for the manufacture of magnetic recording media exhibiting improved stability of the magnetic properties under adverse climatic conditions.

6 Claims, No Drawings

MAGNETIC RECORDING MEDIUM AND METHOD OF STABILIZATION OF CHROMIUM DIOXIDE MAGNETIC PIGMENTS

The present invention relates to the manufacture and use of chromium dioxide magnetic pigments, the pigments and the magnetic recording media manufactured therewith having improved stability to loss of magnetic properties under adverse climatic conditions.

The surface treatment of chromium dioxide magnetic pigments to improve their stability has been disclosed. Thus, it is known to treat chromium dioxide pigments, in aqueous suspension, with a solution of a reducing agent, eg. a sulfite solution, whereby a protective layer of chromium(III) oxide or hydrated chromium(III) oxide is produced on the pigment surface. The pigment is then washed to remove the sulfate or sulfite, and is dried. The stability of the resulting magnetic pigments depends on the thickness of the protective layer of chromium(III) oxide which is formed, but because of the high remanence values required for the manufacture of high quality magnetic tapes, this layer must not be very thick. Accordingly, the chromium dioxide pigments obtained, and the magnetic tapes manufactured therefrom, do not satisfy the required standards of stability of properties under adverse climatic conditions. The same applies to chromium dioxide pigments which have been stabilized in accordance with the disclosure of U.S. Pat. No. 3,686,031 by applying a protective layer of an inorganic metal phosphate; the stabilization achieved is inadequate.

It is an object of the present invention to manufacture magnetic recording media, exhibiting improved stability to loss of magnetic properties under adverse climatic conditions using chromium dioxide magnetic pigments.

It is a further object of the invention to provide suitable chromium dioxide magnetic pigments for use in the magnetic layer of such improved magnetic recording media.

It is a further object of the invention to finish the chromium dioxide magnetic pigments, when stablizing them, so that the orientability of the anisotropic particles in the magnetic field is also improved.

We have found that these objects are substantially achieved by suspending the chromium dioxide magnetic pigments in a medium selected from water, aliphatic alcohols of 1 to 4 carbon atoms and mixtures of water with the said alcohols, then treating them by adding from 1 to 40% by weight, based on chromium dioxide, of a block copolymer consisting of siloxane units and alkyleneoxy units of 2 to 4 carbon atoms, the alkyleneoxy units being bonded to the polysiloxane radicals by a Si—O—C or Si—C group, separating off the treated chromium dioxide and drying it at from 50° to 200° C.

Suitable block copolymers containing siloxane units and alkyleneoxy units of 2 to 4 carbon atoms, which are advantageously added to the suspension in an amount of from 1 to 40 percent by weight, preferably from 3 to 20 percent by weight, based on the amount of chromium dioxide to be treated, are, above all, block copolymers (which term is to be understood to include graft copolymers) of polymeric alkylsiloxanes, arylsiloxanes, or aralkylsiloxanes (where in general alkyl is of 1 to 8 carbon atoms, aryl of 6 to 8 carbon atoms, and aralkyl of 7 or 8 carbon atoms) with poly-1,2-alkylene oxides, especially poly-1,2-propylene oxide and/or polyethylene oxide or polyalkylene glycols of 2 to 4 carbon atoms and especially of 2 or 3 carbon atoms. Block copolymers of this type contain either Si—O—C or Si—C groups. Suitable silicone/polyalkylene oxide copolymers containing Si—O—C groups may be obtained by reacting hydroxyl-containing polyethers with silanes or siloxanes which contain Si—O—$C_2H_5$ groups (compare U.S. Pat. No. 2,834,748 and British Pat. No. 892,819), Si—H groups (compare British Pat. Nos. 892,819 and 954,041) or Si—N groups (compare British Pat. No. 1,071,568). Suitable siloxane/polyether copolymers in which the siloxane is directly bonded to the polyether by an Si—C bond may be obtained by an addition reaction of polyethers, containing alkylene groups, at an Si—H bond (cf. U.S. Pat. No. 2,868,824, French Pat. No. 1,179,743 and Belgian Pat. No. 603,553). A further suitable method of manufacture of such compounds is to react siloxanes, containing bromomethyl groups, with the OH groups of polyethers in the presence of tertiary amides (cf. Belgian Pat. No. 603,832). Polysiloxane/polyether block copolymers which have been produced, in accordance with Belgian Pat. No. 627,281, by reacting silicon compounds, possessing epoxy groups, with the OH group of a polyether, may also be used. In these polysiloxane/polyether block copolymers the siloxane component may be present in the form of linear chains or of rings of 3 to 9 dimethylsiloxane units. Further suitable compounds may also be manufactured by the methods described in U.S. Pat. Nos. 3,480,583 and 3,629,310. Compounds of this type may be water-soluble or water-insoluble, depending on the proportion of polyether groups. Water-soluble or readily water-emulsifiable siloxane/polyether block copolymers are preferred for the process according to the invention.

Block copolymers where the number of alkyleneoxy units of 2 to 4 carbon atoms is at least equal to the number of siloxane units in the molecule, preferably at least twice as great and in particular from about twice to ten times as great, are very suitable for achieving the desired effect to its full extent. Preferably, the block copolymers have a polysiloxane block of from about 2 to 60, and especially from 4 to 30, siloxane units, with terminal and/or lateral alkyleneoxy units of 2 to 4 carbon atoms, the number of these latter units being from about 1 to 10 times, and especially from 2 to 8 times, the number of siloxane units in the molecule.

Formulae I to VII given below show structural types of suitable block copolymers containing siloxane units and alkyleneoxy units, the block copolymers of the types of structure represented by formulae I and III being preferred.

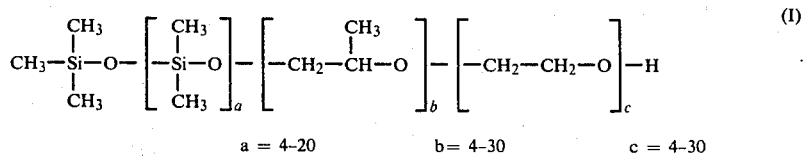

-continued

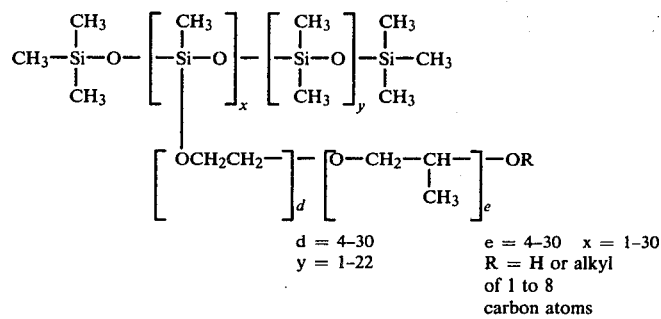

d = 4–30   e = 4–30   x = 1–30
y = 1–22   R = H or alkyl
           of 1 to 8
           carbon atoms (II)

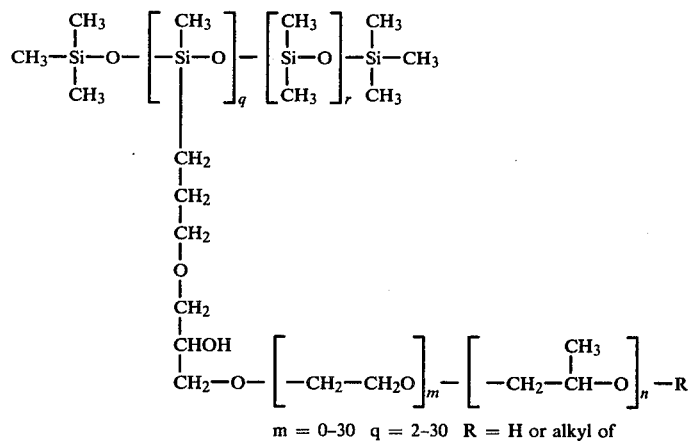

m = 0–30   q = 2–30   R = H or alkyl of
n = 0–30   r = 1–24   1 to 8 carbon atoms (III)

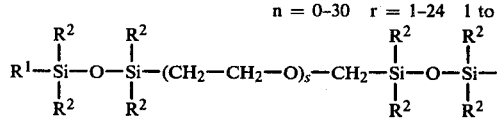

s = 3–30   $R^1$ = alkyl of 1 to 6 carbon atoms
           $R^2$ = alkyl of 1 to 8 carbon atoms,
                  aryl or aralkyl (IV)

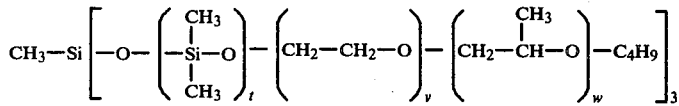

t = 2–40   v = 3–30   w = 3–30

(V)

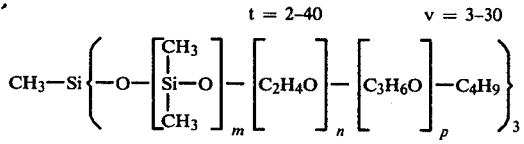

m = 2–10   n = 0–30   p = 0–30

(VI)

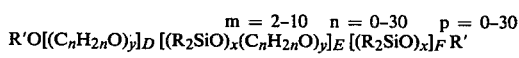

(VIII)

n = 2–4
y = 5 or above   R' = 4
x = 2 or above
D = 0 or 1
E = 1 or above   R = alkyl of 1 to 6 carbon atoms
F = 0 or 1

The treatment, according to the invention, of the chromium dioxide magnetic pigment with the block copolymer is carried out by adding a solution or suspension of the block copolymer to the suspension of the magnetic pigment and continuing the vigorous stirring, required to produce the pigment suspension, for at least 2 minutes and preferably from 30 minutes to 90 minutes. The temperature is at most 100° C. and preferably from 20° to 80° C. Following this treatment, the chromium dioxide magnetic pigment is separated from the aqueous and/or alcoholic phase and is dried at from 50° to 200° C., preferably at from 50° to 110° C. Spray-drying has proved particularly advantageous.

Chromium dioxide magnetic pigments which may be used are the conventional, preferably acicular, pigments of ferromagnetic crystalline chromium-IV dioxide. These may already possess a protective surface layer before the silicon compounds are applied in accordance with the invention. Thus, chromium dioxide magnetic pigments which, after reduction of the pigment surface, already carry a thin protective layer of chromium(III) oxide or hydrated oxide are very suitable.

Liquids which may be used advantageously for suspending the chromium dioxide magnetic pigments are water and lower aliphatic alcohols, especially monohydric alcohols of 1 to 4 carbon atoms, eg. methanol, ethanol, propanol or isobutanol, and the corresponding alcohol/water mixture. In the preferred embodiment of the process, water is used as the liquid for the production of the suspension. The mixture of chromium dioxide magnetic pigment, water and block copolymer usually has a slightly acid pH. Even if the particular composition of the suspension gives a different pH, it is advantageous to bring the pH to a slightly acid value, of from 2 to 6, by adding an acid, eg. acetic acid.

It is assumed that in the process of the invention the siloxane/polyether block copolymers attach themselves at least partially to the pigment surface by their polar groups. It is particularly advantageous to carry out the treatment, according to the invention, of the chromium dioxide with the block copolymer in suspension. Adding the block copolymer when preparing the dispersion, or spraying the block copolymer onto the pigment powder, does not give equally advantageous stabilization effects.

The chromium dioxide magnetic pigments stabilized in accordance with the invention may be converted by conventional methods to dispersions of the pigments in binders and solvents, for use in the manufacture of magnetic coatings and magnetic recording media. for the production of magnetic coatings, the ratio of magnetic pigment to binder or binder mixture is in general from 2 to 10, and especially from 3 to 5, parts by weight of magnetic pigment per part by weight of binder or binder mixture.

The conventional binders for magnetic pigment dispersions may be used, for example vinyl chloride/vinyl acetate copolymers and their commercial hydrolysis products containing from about 5 to 20 percent by weight or vinyl alcohol units, copolymers of vinyl chloride with lower esters of maleic acid or fumaric acid, polyvinylformals, copolyamides, mixtures of elastomeric, virtually isocyanate-free polyester-urethanes with vinyl chloride/vinyl acetate copolymers, vinylidene chloride/arylonitrile copolymers, polyesters or phenoxy resins, as described in German Published application DAS No. 1,282,700, U.S. Pat. No. 3,144,352, German Published application DAS No. 1,269,661 and German Published application DAS No. 1,295,011, and especially mixtures of (a) from 15 to 80 parts by weight of a soluble, thermoplastic and virtually hydroxyl-free polyester-urethane obtained from an aliphatic dicarboxylic acid of 4 to 6 carbon atoms, eg. adipic acid, an aliphatic diol of 4 to 10 carbon atoms, eg. 1,4-butanediol, and a diisocyanate of 8 to 20 carbon atoms, eg. 4,4'-diisocyanato-diphenylmethane, and (b) from 85 to 20 parts by weight of a polyvinylformal which contains at least 65, preferably at least 80, percent by weight of vinylformal units, based on the polymer. Very suitable polyvinylformals contain from 5 to 13 percent by weight of vinyl alcohol units, from 7 to 15 percent by weight of vinyl acetate units and from 80 to 88 percent by weight of vinylformal units and preferably have a viscosity of from 50 to 120 centipose, measured at 20° C. on a solution of 5 g of polyvinylformal in 100 ml of a 1:1 phenol-toluene mixture.

Suitable polyester-urethanes are, for example, those described in German Published application DAS No. 1,106,959 and especially the corresponding products manufactured using branched glycols of 4 to 12 carbon atoms, eg. neopentylene glycol, as the sole glycols or as mixtures with linear glycols, eg. ethylene glycol or 1,4-butanediol.

Non-magnetic and non-magnetizable bases which may be used for the coated magnetic recording media are the conventional rigid and flexible base materials, especially films of linear polyesters, e.g. polyethylene terephthalate, the thickness of the films being, in general, from 5 to 50 $\mu$m, and especially from 10 to 35 $\mu$m.

The magnetic coatings can be produced in the conventional manner. Advantageously, the magnetic dispersion, produced in a dispersing apparatus, eg. a tubular ball mill or a stirred ball mill, from the magnetic pigment and a solution of the binders, in the presence of dispersing agents and other conventional additives, is filtered and then applied, as one or more thin layers on the non-magnetic base, or as a thin layer on a magnetic recording medium already carrying another magnetic coating, the application being effected with conventional coating equipment, e.g. by means of a knife coater. As a rule, the magnetic pigments in the coating thus applied are subjected to magnetic orientation before the liquid coating mixture is dried on the base; this drying is advantageously carried out for from about 2 to 5 minutes at from about 50° to 90° C. where coatings on thermoplastic bases, eg. on films, are concerned. The magnetic coatings can then be calendered and compressed by passing them between heated and polished rollers, preferably at from about 60° to 80° C. The thickness of the magnetic coatings is in general from 1 to 15 $\mu$m and in particular from 3 to 8 $\mu$m.

The chromium dioxide magnetic pigments stabilized in accordance with the invention are distinguished by excellent dispersibility and processability. It was surprising that notwithstanding the severe mechanical stresses to which they are in most cases exposed during dispersing, the pigments give magnetic recording media which, in a moist warm climate, exhibit a stability to loss of magnetic properties which is many times greater than the stability of the corresponding untreated chromium dioxide magnetic pigments. It is a particular advantage that the use of the stabilized magnetic pigments also results in improved magnetic orientability compared to untreated pigments.

In the Examples and Comparative Experiments which follow, parts and percentages are by weight, unless stated otherwise. Parts by volume bear the same relation to parts as that of the liter to the kilogram.

EXAMPLE 1

2.4 parts (Example 1 A), 4.8 parts (Example 1 B) or 7.2 parts (Example 1C) of a poly-(ethoxy-propoxy-dimethyl-siloxane), comprising 6 dimethylsiloxane units, 20 ethoxy units and 20 propoxy units and having the structure shown in formula (I), are added to a suspension of 40 parts of chromium dioxide in 110 parts of water. The pH of the suspension is from 3.6 to 3.9 and the temperature is brought to 40° C. in the course of stirring vigorously for 2 hours. The chromium dioxide is then filtered off and is dried for 8 hours in air at 90° C.

Magnetic tapes are produced using the resulting chromium dioxide magnetic pigments from the 3 batches, and also using a chromium dioxide magnetic pigment from the same original $CrO_2$ production batch, but without carrying out the treatment according to the invention (comparative Experiment 1); the production of the magnetic tapes is carried out in separate batches, but using the same method in each case. In this, about 35 parts of pigment, 0.2 part of stearic acid, 0.8 part of isopropyl myristate, 27 parts of a solution, of about 13% strength, of an elastomeric polyesterurethane (obtained from adipic acid, 1,4-butanediol and 4,4'-diisocyanato-diphenylmethane) in a mixture of equal parts of tetrahydrofuran and dioxane, 20 parts of a 13% strength solution of a polyvinylformal in a 1:1 tetrahydrofuran/dioxane mixture and 36 parts of the last-mentioned solvent mixture are dispersed for several days in a tube mill, using steel balls; the dispersion is then filtered through filter paper, under pressure, and is cast on about 25 μm thick polyethylene terephthalate films. The magnetic coatings are magnetically oriented, dried at from about 70° to 90° C., and passed between rollers heated to about 80° C. in order to calender and compress them.

The magnetic properties are then measured on the resulting four different magnetic tapes (compare Table 1). To determine the stability of the magnetic tapes to loss of magnetic properties under adverse climatic conditions, samples of the tapes are stored in a conditioning cabinet at 65° C. and 95% relative humidity and the time required for the saturation magnetization of a sample to decrease to 90% of its value prior to the conditioning test is determined. The time (in days) is given as $t_{90}$ in Table 1. From this it is possible to calculate a relative factor $F_{rel} = T_{90}$ treated/$t_{90}$ untreated, and this factor is shown in the last column of Table 1.

TABLE 1

Magnetic data of the tape, and decrease in saturation magnetization in the course of the conditioning test.

| | $M_m$ [mT] | Orientation factor OF | $H_c$ [kA/m] | $t_{90}$ [days] | $F_{rel}$ |
|---|---|---|---|---|---|
| Example 1 A | 167 | 3.35 | 37.3 | 16.8 | 2.66 |
| Example 1 B | 188 | 3.22 | 37.7 | 18.0 | 2.85 |
| Example 1 C | 181 | 3.20 | 37.2 | 17.4 | 2.76 |
| Comparative Experiment 1 | 177 | 2.67 | 37.7 | 6.3 | 1 |

EXAMPLE 2

10 parts of a block copolymer of the formula

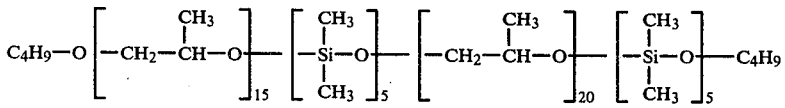

are added to 100 parts of chromium dioxide suspended in 500 parts of water, and the mixture is heated to 53° C. in the course of 30 minutes, with vigorous stirring. The pH of the suspension is 4.0. The treated chromium dioxide is filtered off and dried for 5 hours in air at 100° C.

Using the method described in Example 1, magnetic tapes are produced with this pigment and with the corresponding untreated pigment (Comparative Experiment 2) and measurements are carried out as described in Example 1. The results are shown in Table 2.

TABLE 2

| | $M_m$ [mT] | OF | $H_c$ [kA/m] | $t_{90}$ [days] | $F_{rel}$ |
|---|---|---|---|---|---|
| Example 2 | 146 | 3.21 | 38.7 | 17.4 | 3.11 |
| Comparative Experiment 2 | 155 | 2.78 | 38.6 | 5.6 | 1 |

EXAMPLE 3

12.5 parts of a compound of the formula

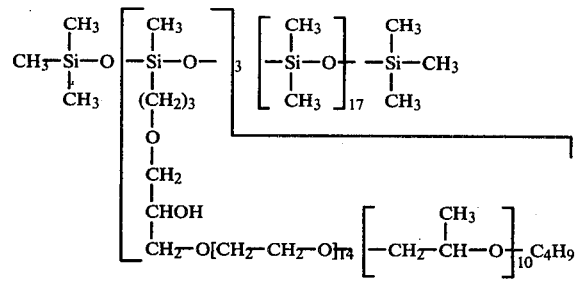

are added to a suspension of 100 parts of chromium dioxide in 600 parts of water. The suspension is heated to 45° C., while stirring, and the pH is brought to 5.5 by dropwise addition of a dilute ammonia solution. The mixture is then stirred for 1 hour at 45° C., after which the product is filtered off. The pigment is dried under reduced pressure at 90° C.

Thereafter, the pigment is processed as described in Example 1. The magnetic tape (and the tape from a comparative experiment with untreated pigment) give the following data:

TABLE 3

| | $M_m$ [mT] | OF | $H_c$ [kA/m] | $t_{90}$ [days] | $F_{rel}$ |
|---|---|---|---|---|---|
| Example 3 | 152 | 3.14 | 38.5 | 19.2 | 3.1 |
| Comparative Experiment 3 | 154 | 2.77 | 38.4 | 6.2 | 1 |

EXAMPLE 4

10 parts of a compound of the formula

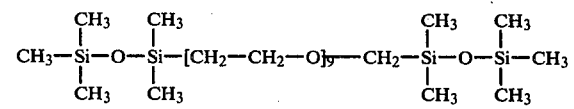

are added to a suspension of 100 parts of chromium dioxide in 600 parts of water and the mixture is stirred for 2 hours at 37° C. After filtering off, and drying in air at 100° C., the treated chromium dioxide is processed as described in Example 1, to give a magnetic tape. The data obtained are shown in Table 4.

EXAMPLE 5

The procedure described in Example 4 is followed, except that the compound of the formula

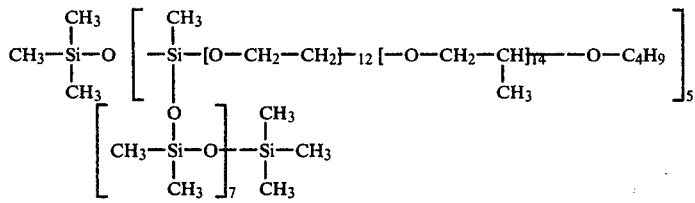

is employed. The data obtained are shown in Table 4.

COMPARATIVE EXPERIMENT 4

A magnetic tape is produced as described in Example 4, but with a corresponding untreated chromium dioxide. The results are shown in Table 4.

TABLE 4

|  | $M_m$ [mT] | OF | $H_c$ [kA/m] | $t_{90}$ [days] | $F_{rel}$ |
|---|---|---|---|---|---|
| Example 4 | 156 | 3.11 | 38.5 | 15.1 | 2.7 |
| Example 5 | 149 | 3.26 | 38.6 | 14.4 | 2.56 |
| Comparative Experiment 4 | 165 | 2.63 | 38.5 | 5.1 | 1 |

COMPARATIVE EXPERIMENT 6

100 parts of a chromium dioxide as obtained after the conventional surface reduction with sulfite are processed, without additional treatment, with a block copolymer as described in Example 1, to produce a magnetic tape.

The test results are shown in Table 5.

COMPARATIVE EXPERIMENT 7

100 parts of a chromium dioxide which has been surface-reduced as in Comparative Experiment 6 are treated with 12.5 parts of the block copolymer employed in Example 1, by spraying the block copolymer into a vessel, of 500 parts capacity, which contains the pulverulent chromium dioxide and is rotating at 200 rpm. A magnetic tape is produced with this chromium dioxide by the method described in Example 1, and is tested accordingly. The results are shown in Table 5.

COMPARATIVE EXPERIMENT 8

A chromium dioxide which has been surface-reduced as in Comparative Experiment 6 is processed as described in Example 1, to give a magnetic tape. However, when adding the binder solution to the batch, 10 parts (based on the amount of chromium dioxide) of the block copolymer used in Example 1 are also added. The resulting magnetic tape is tested as previously described. The results are shown in Table 5.

TABLE 5

|  | $M_m$ [mT] | OF | $H_c$ [kA/m] | $t_{90}$ [days] | $F_{rel}$ |
|---|---|---|---|---|---|
| Comparative Experiment 6 | 157 | 2.67 | 39.4 | 4.7 | 1 |
| Comparative Experiment 7 | 143 | 2.98 | 39.5 | 8.3 | 1.77 |
| Comparative Experiment 8 | 141 | 2.63 | 39.1 | 6.9 | 1.47 |

We claim:

1. A process for stabilizing chromium dioxide magnetic particles against loss of their magnetic properties which comprises: suspending the chromium dioxide particles in a medium chosen from water, aliphatic alcohols of 1 to 4 carbon atoms and mixtures of water with the said alcohols, treating the suspended particles by adding to the suspension from 1 to 40% by weight, based on the chromium dioxide, of a block copolymer consisting of siloxane units and alkyleneoxy units of 2 to 4 carbon atoms, the alkyleneoxy units being bonded to the polysiloxane radical by a Si—O—C or Si—C group, separating the particles from the suspension, drying the particles at a temperature of from 50° to 200° C., whereby the block copolymer is bonded to the surface of the chromium dioxide particles.

2. A process as set forth in claim 1, wherein the treatment of the chromium dioxide with the block copolymer is carried out at below 100° C., preferably at from 20° to 80° C., for from 2 to 90 minutes.

3. A process as set forth in claim 1, wherein the block copolymers are water-soluble.

4. A process as set forth in claim 1, wherein the number of alkyleneoxy units of 2 to 4 carbon atoms in the block copolymer is at least equal to, and preferably at least twice, the number of siloxane units.

5. A process as set forth in claim 1, wherein the block copolymer molecule contains a polysiloxane block of from about 2 to 60 siloxane units and terminal and/or lateral alkyleneoxy units of 2 to 4 carbon atoms, the number of alkyleneoxy units being from about one to ten times the number of siloxane units.

6. A magnetic recording medium comprising a support bearing a layer containing acicular ferromagnetic chromium dioxide particles as defined in claim 1.

* * * * *